US007000057B1

(12) United States Patent
Novell et al.

(10) Patent No.: US 7,000,057 B1
(45) Date of Patent: Feb. 14, 2006

(54) METHOD AND APPARATUS FOR ADDING OTG DUAL ROLE DEVICE CAPABILITY TO A USB PERIPHERAL

(75) Inventors: Paul W. Novell, San Francisco, CA (US); David G. Wright, Woodinville, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 339 days.

(21) Appl. No.: 10/073,434

(22) Filed: Feb. 11, 2002

(51) Int. Cl.
*G06F 13/36* (2006.01)

(52) U.S. Cl. .................. 710/306; 709/209
(58) Field of Classification Search ............ 710/305, 710/306, 308, 310–315; 709/208, 209, 210–211
See application file for complete search history.

(56) References Cited

U.S. PATENT DOCUMENTS

| | | | | |
|---|---|---|---|---|
| 6,128,732 | A * | 10/2000 | Chaiken ............... | 713/2 |
| 6,721,332 | B1 * | 4/2004 | McAlear ............... | 370/466 |
| 6,754,811 | B1 * | 6/2004 | Cato et al. ............ | 712/227 |
| 6,816,750 | B1 * | 11/2004 | Klaas .................. | 700/121 |
| 2003/0030412 | A1 * | 2/2003 | Matsuda et al. ....... | 320/127 |
| 2003/0101308 | A1 * | 5/2003 | Chang et al. .......... | 710/305 |
| 2003/0101311 | A1 * | 5/2003 | Chang et al. .......... | 710/310 |
| 2003/0104835 | A1 * | 6/2003 | Douhet ................ | 455/557 |
| 2004/0008684 | A1 * | 1/2004 | Garney et al. ......... | 370/395.4 |

OTHER PUBLICATIONS

"USB On-The-Go Basics", Application Note 1822, Maxim Integrated Products, Dec. 20, 2002, 4 pp. (http://pdfserv-.maxim-ic.com/en/an/AN1822.pdf).*
"Cypress Introduces Industry's First USB On-The-Go (OTG) Reference Design", Cypress Press Release, Dec. 18, 2001, pp. 1-2.
"SL811HS OTG Application Note", Cypress Semiconductor Corporation, Dec. 17, 2001, pp. 1-4.
"Universal Serial Bus Specification", Revision 1.1, Sep. 23, 1998, pp. 1-311.
"Universal Serial Bus Specification", Revision 2.0, Apr. 27, 2000, pp. 1-622.
"On-The-Go Supplement to the USB Specification", Revision 1.0, Dec. 18, 2001, pp. 1-66.

* cited by examiner

*Primary Examiner*—Tim Vo
*Assistant Examiner*—Clifford Knoll
(74) *Attorney, Agent, or Firm*—Christopher P. Maiorana, PC

(57) ABSTRACT

An apparatus comprising a first circuit, a second circuit and a third circuit. The first circuit may be configured to communicate as a host through a first interface. The second circuit may be configured to communicate through a second interface as a host when in a first mode and as a peripheral when in a second mode. The third circuit may be configured to (i) control the first and the second circuits and (ii) transfer information between the first and the second circuits.

23 Claims, 6 Drawing Sheets

METHOD AND APPARATUS FOR ADDING OTG DUAL ROLE DEVICE CAPABILITY TO A USB PERIPHERAL

FIELD OF THE INVENTION

The present invention relates to a method and/or architecture for connecting USB peripheral devices generally and, more particularly, to a method and/or architecture for adding USB on-the-go (OTG) dual role device (DRD) capability to existing USB peripheral devices without modification to the existing silicon.

BACKGROUND OF THE INVENTION

The USB on-the-go (OTG) supplement to the USB specification 2.0 (revision 1.0, published Dec. 18, 2001 and hereby incorporated by reference in its entirety) has been developed to provide a framework for the inclusion of limited USB host capability in devices that were previously simply PC peripherals. Many of the USB products available will soon feature USB OTG rather than basic (legacy) USB capability. As vendors of such products seek to bring the first USB OTG devices to market, architectures that minimize the changes required to existing product designs are desirable. Such configurations allow new products to get to market as quickly as possible with as little additional investment as possible.

The installed base of USB peripherals is in the hundreds of millions of devices, and is continuing to grow rapidly. Although many USB devices are simple input devices (i.e., mice, keyboards, etc.), many of the highest volume USB devices are products such as mass storage devices (i.e., hard disks, flash cards, CD-ROM drives, etc.), MP3 players, digital still cameras, scanners and cellular phone handsets. Directly connecting such devices to each other rather than only to desktop (or laptop) computers is desirable.

However, the addition of host capability to an existing USB peripheral device, no matter how limited, is not a minor change. Additionally, there are no existing USB on-the-go (OTG) semiconductor devices that are "drop-in" (or close) replacements for existing USB peripheral silicon device families. Furthermore, the firmware requirements and architecture of a USB host is generally very different from that of a USB peripheral.

A typical USB OTG upgrade from legacy USB (i) requires substantial hardware re-design (i.e., USB peripheral silicon needs to be replaced with OTG dual role device silicon, resulting in new board design/layout), (ii) requires substantial firmware redesign (i.e., USB peripheral firmware is typically structured differently from host firmware, with different interrupt latency run-frequency required), (iii) has long time to market and substantial new product development investment that makes launching "pilot" products to test the market costly, (iv) lacks product range flexibility, (v) is difficult and expensive (i.e., vendors cannot provide both OTG and non-OTG devices on the same platform) and (vi) does not provide an upgrade path for the installed base or obsolete inventory of USB devices.

There is a general assumption among USB OTG suppliers that potential sales of OTG devices would be slow, and the transition from USB peripheral to OTG dual role device capability in most types of devices would take many years. In addition, the migration to OTG functionality in some otherwise relatively mature market segments will leave the owners and users of legacy USB peripherals with a potentially large but obsolete investment.

Therefore, product vendors may see a substantial drop-off in demand for legacy USB products after USB OTG products (with attendant enhanced functionality) are announced, but not yet available for purchase. The availability of an inexpensive accessory to add OTG functionality to legacy products would find a ready market with owners and users of older devices. Such an accessory could also be used by vendors to reduce the drop-off in demand during the introduction of new OTG products. Furthermore, obsolete stock could be upgraded to a saleable level of functionality.

SUMMARY OF THE INVENTION

The present invention concerns an apparatus comprising a first circuit, a second circuit and a third circuit. The first circuit may be configured to communicate as a host through a first interface. The second circuit may be configured to communicate through a second interface as a host when in a first mode and as a peripheral when in a second mode. The third circuit may be configured to (i) control the first and the second circuits and (ii) transfer information between the first and the second circuits.

The objects, features and advantages of the present invention include providing a method and/or architecture for enabling USB peripheral devices as USB OTG dual role devices without modification to the device itself that may (i) provide a fast and low-cost on-the-go derivative of a USB peripheral, (ii) provide OTG functionality to existing USB peripheral designs without the need to re-architect the existing design and/or (iii) provide an architecture for aftermarket accessories adding OTG functionality to the existing installed base of USB peripherals.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
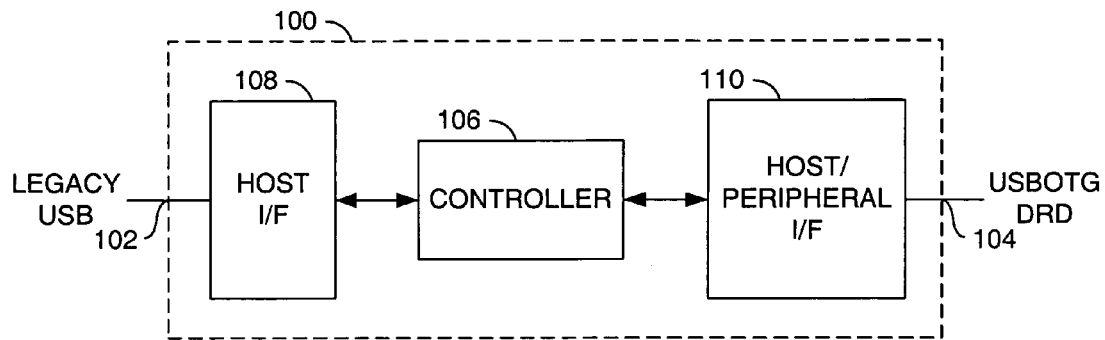
FIG. 1 is a block diagram of a preferred embodiment of the present invention.

Referring to FIG. 1, a block diagram of a circuit (or system) 100 in accordance with a preferred embodiment of the present invention is shown. The system 100 may be configured to enhance a Universal Serial Bus (USB) peripheral device by adding USB on-the-go (OTG) functionality without substantially redesigning the device. The circuit 100 may be compliant with the USB specification version 1.0 (published November 1996), the USB specification version 1.1 (published September 1998), the USB specification version 2.0 (published April 2000), and/or the USB On-the-Go supplement to the USB 2.0 specification version 1.0 (published December 2001), which are hereby incorporated by reference in their entirety.

USB 1.1 compliant devices can operate at low speed (1.5 Mbits/sec) and/or full speed (12 Mbits/sec). USB 2.0 compliant devices can operate at high speed (480 Mbits/sec) as well as low and full speeds. USB 1.1 speeds of low and full speed are often referred to as "classic" USB. USB 2.0 is sometimes referred to as "hi-speed" USB (e.g., a USB 2.0 device may be labeled with a logo indicating hi-speed USB certification). Although the present invention is generally described herein with reference to the USB 2.0 specification, the present invention is applicable to low speed, full speed and high speed USB, and any combination thereof. In one example, a preferred embodiment of the present invention may be implemented to exclusively support full speed devices.

In one example, the present invention may enable manufacturers of USB peripheral devices to convert a legacy USB peripheral device into a USB OTG dual role device (DRD) with no modification. Alternatively, the system 100 may be implemented as a USB OTG to legacy USB bridge. The system 100 may provide a hardware architecture where a single additional integrated circuit (IC) provides OTG functionality to an existing USB peripheral device design with little or no modification. The system 100 may be implemented either as an integrated solution (e.g., implementing an additional IC within the enclosure of a product) or as an accessory architecture (e.g., implementing an IC within an external enclosure).

The circuit 100 may have a port (interface) 102 and a port (interface) 104. The port 102 may be configured to couple the circuit 100 as a host to a legacy USB device. The port 104 may be configured, in one example, to couple the circuit 100 to either a USB OTG host or peripheral device. When a legacy USB device is coupled to the circuit 100, the circuit 100 may be configured to make the legacy USB device appear to be a USB OTG device. The circuit 100 may be configured to implement OTG features such as the host negotiation protocol (HNP) and session request protocol (SRP).

The circuit 100 may comprise a block (or circuit) 106, a block (or circuit) 108, and a block (or circuit) 110. The circuit 106 may be implemented, in one example, as a controller circuit. For example, the circuit 106 may be implemented as a microcontroller or microprocessor. However, other types of hardware may be implemented to meet the design criteria of a particular application (e.g., an application specific integrated circuit (ASIC), digital signal processor (DSP), programmable logic device, CPLD, FPGA, etc.).

The circuit 108 may be implemented, in one example, as a USB 2.0 controller (e.g., compliant with the USB 2.0 specification). The circuit 108 may be configured to appear as a host to a connected device. The circuit 110 may be implemented, in one example, as a USB 2.0 OTG DRD controller (e.g., compliant with both the USB 2.0 specification and the On-The-Go supplement to the USB 2.0 specification, revision 1.0). The port 110 may be configured to appear as either a USB 2.0 OTG host or USB 2.0 OTG peripheral device. The port 110 may be configured to implement OTG features such as the host negotiation protocol (HNP) and session request protocol (SRP).

Figure 2:
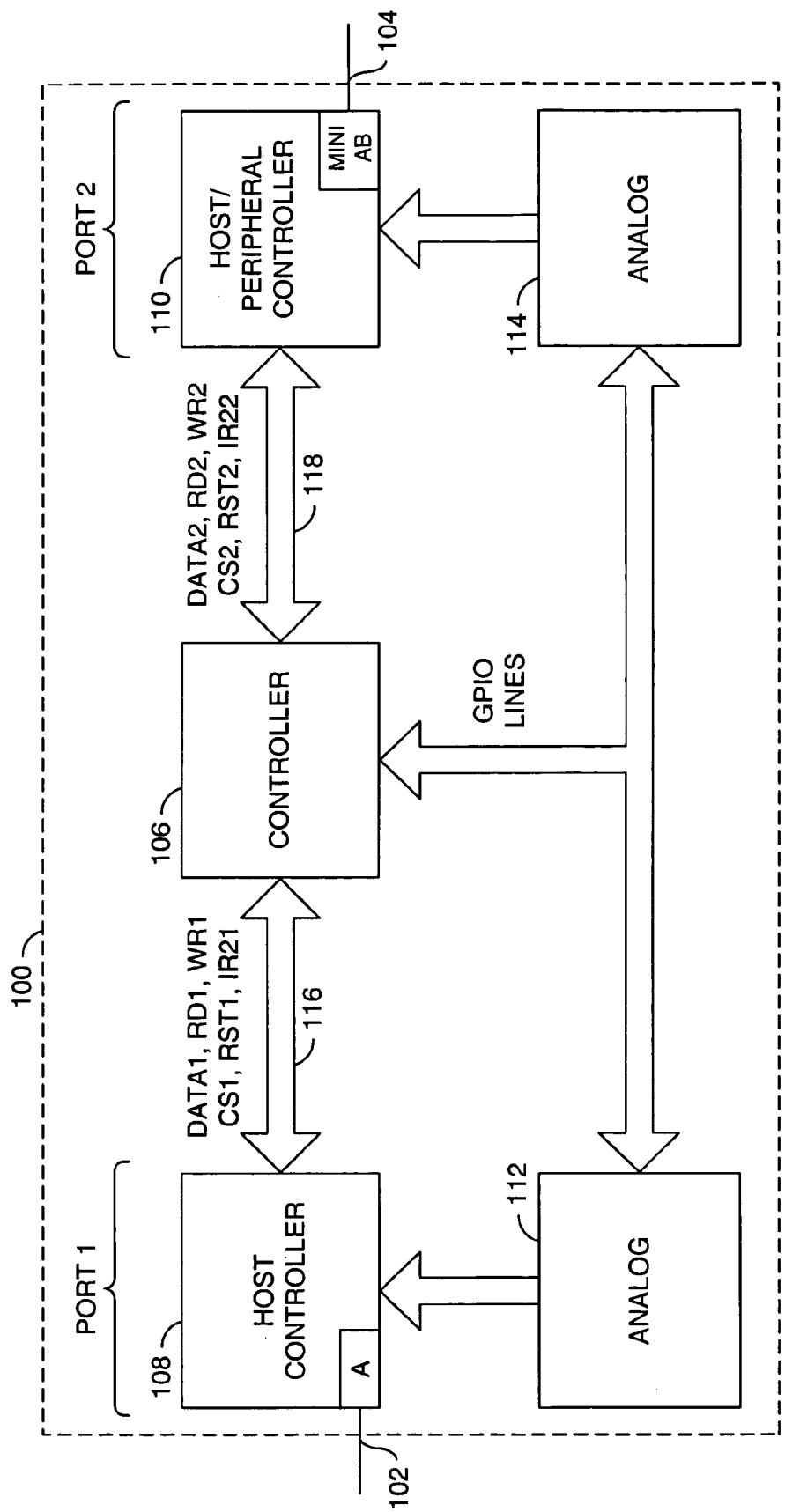
FIG. 2 is a more detailed block diagram of a preferred embodiment of the present invention.

Referring to FIG. 2, a more detailed block diagram of a circuit 100 of FIG. 1 is shown. The circuit 100 may further comprise an analog block (circuit) 112 and an analog block (circuit) 114. The analog blocks 112 and 114 may be configured to detect and/or control VBUS thresholds, host D+ and D− pull-down, slave D+pull-up, VBUS pulsing, ID pin sensing, overcurrent control and detection, host/slave LED indication, and VBUS On/Off control. The analog blocks 112 and 114 may be coupled to the controller 106 via general purpose input/output (GPIO) lines. In one example, the circuit 108 may comprise a type A connector and the circuit 110 may comprise a mini AB connector. However, other connectors may be implemented accordingly to meet the design criteria of a particular implementation.

The circuit 106 may be coupled to the circuit 108 via a bus 116. The bus 116 may carry a number of signals between the circuit 106 and the circuit 108 (e.g., DATA1, RD1, WR1, CS1, RST1, IRQ1, etc.). The signal DATA1 may be implemented as a data signal. The signal RD1 may be implemented as a read control signal. The signal WR1 may be implemented as a write control signal. The signal CS1 may be implemented as a chip select signal. The signal RST1 may be implemented as a reset signal. The signal IRQ1 may be implemented as an interrupt request signal.

The circuit 106 may be coupled to the circuit 110 via a bus 118. The bus 118 may carry a number of signals between the circuit 106 and the circuit 110 (e.g., DATA2, RD2, WR2, CS2, RST2, IRQ2, etc.). The signal DATA2 may be implemented as a data signal. The signal RD2 may be implemented as a read control signal. The signal WR2 may be implemented as a write control signal. The signal CS2 may be implemented as a chip select signal. The signal RST2 may be implemented as a reset signal. The signal IRQ2 may be implemented as an interrupt request signal.

Figure 3:
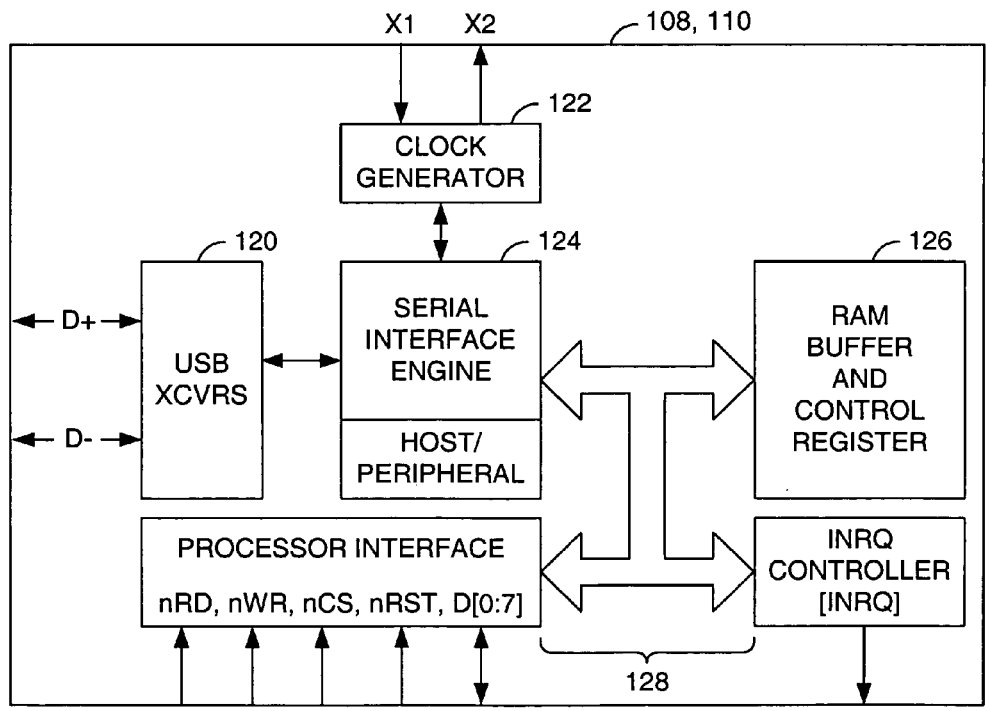
FIG. 3 is a more detailed block diagram of a host/peripheral controller in accordance with a preferred embodiment of the present invention.

Referring to FIG. 3, a more detailed block diagram of a port controller of FIG. 2 is shown. The circuits 108 and 110 may comprise a USB transceiver 120, a clock generator 122, a serial interface engine (SIE) 124, a memory and control register block 126 and an interface block 128. The SIE 124 may be configured to handle host and/or peripheral device protocols. The interface block may be configured to receive control and data signals (e.g., RD, WR, CS, RST, DATA) and present interrupts and data signals (e.g., IRQ and DATA).

Figure 4:
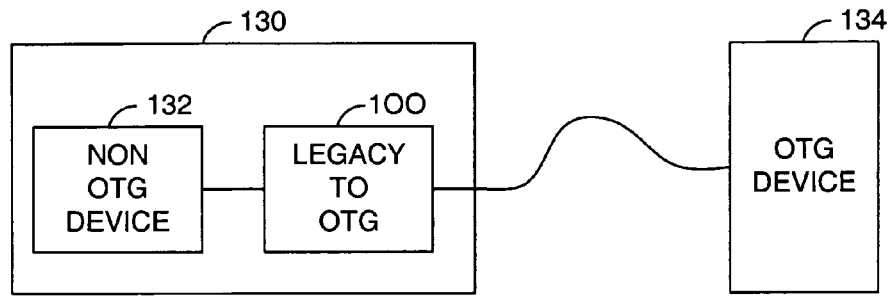
FIG. 4 is a block diagram of a peripheral device in accordance with a preferred embodiment of the present invention.

Referring to FIG. 4, a block diagram of a peripheral device 130 in accordance with a preferred embodiment of the present invention is shown. The peripheral device 130 may comprise a non-OTG compliant device 132 and the circuit 100. The non-OTG device 132 may be coupled to an OTG compliant device 134 via the circuit 100. The circuit 100 may be configured such that the circuit 132 appears to the OTG compliant device 134 as an OTG compliant device.

Figure 5:
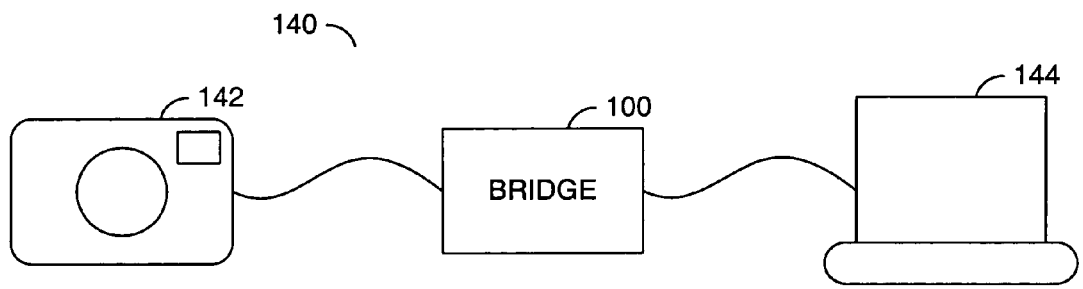
FIG. 5 is a block diagram of an alternate embodiment of the present invention.

Referring to FIG. 5, a block diagram of a system 140 in accordance with an alternative embodiment of the present invention is shown. The circuit 100 may be configured to couple a first legacy device (e.g., a digital still camera) 142 to a second legacy device (e.g., a printer) 144. The circuit 100 may be configured to manage communications between the two legacy devices. In one example, the configuration of the circuit 100 may be implemented in software. Alternatively, the configuration of the circuit 100 may be implemented in firmware or logic (e.g., programmable logic or a state machine). In one example, the circuit 100 may be implemented as part of either the camera or the printer. Alternatively, the circuit 100 may be implemented as a stand-alone device.

Figure 6:
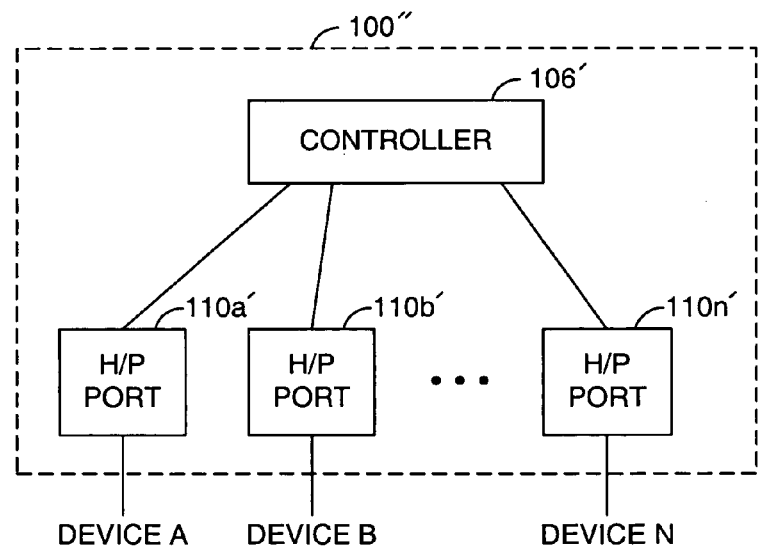
FIG. 6 is a block diagram of another alternate embodiment of the present invention.

Referring to FIG. 6, a block diagram of a circuit 100' illustrating an alternative embodiment of the present invention is shown. The circuit 100' may be implemented similarly to the circuit 100 except that the circuit 100' may comprise a controller 106' and a number of host/peripheral ports 110a'–110n'. The controller circuit 106' may be configured to relay signals received from any one port (e.g., 110i') to all of the other ports 110a'–110n'.

Figure 7:
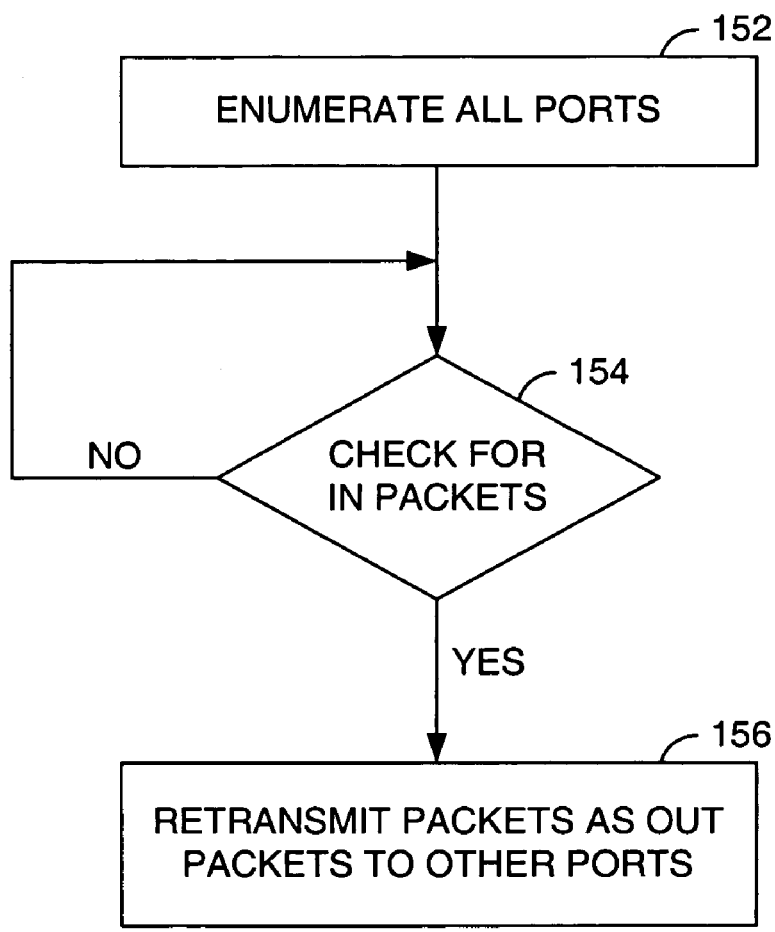
FIG. 7 is a flow diagram of an example operation in accordance with a preferred embodiment of the present invention.

Referring to FIG. 7, a flow diagram 150 illustrating an example operation of the present invention is shown. When the circuit 100 is configured to operate as the OTG host and the device connected to the port 104 is a peripheral, the circuit 100 may first enumerate both the legacy device coupled to the port 102 and the USB OTG device coupled to the port 104 (e.g., the block 152). The circuit 100 may be configured to continuously poll the legacy device coupled to the port 102 for data on each of a number of IN endpoints (e.g., the block 154). The circuit 100 may also poll for data on ISO and interrupt IN endpoints with a frequency specified by the descriptors of the device coupled to the port 102. When data is received from the device coupled to the port 102, the data may be transmitted by the circuit 100 to the USB OTG device coupled to the port 104 (e.g., the block 156) using an appropriate OUT endpoint (if one has been enumerated).

The circuit 100 may also perform the converse operation. The circuit 100 may be configured to poll the IN endpoints of the USB OTG device coupled to the port 104 (e.g., the block 154) and relay the data to the device coupled to the port 102 via one or more OUT endpoints (e.g., the block 156). In general, the endpoints of the USB OTG device coupled to the port 104 and the endpoints of the device coupled to the port 102 need to match in order for the configuration to function properly. A similar configuration may be necessary for any OTG dual role device (DRD), since OTG devices do not necessarily inter-operate as USB peripherals and PCs typically do. In one example, the circuit 100 may allow a legacy USB device coupled to the port 102 to inter-operate with OTG devices having compatible endpoint sets to the legacy USB device. Alternatively, the system 100 may be configured to implement firmware that may be mapped differently but with an endpoint set compatible to an endpoint set of the USB OTG device on the port 104 and an endpoint set of the device coupled to the port 102.

Figure 8:
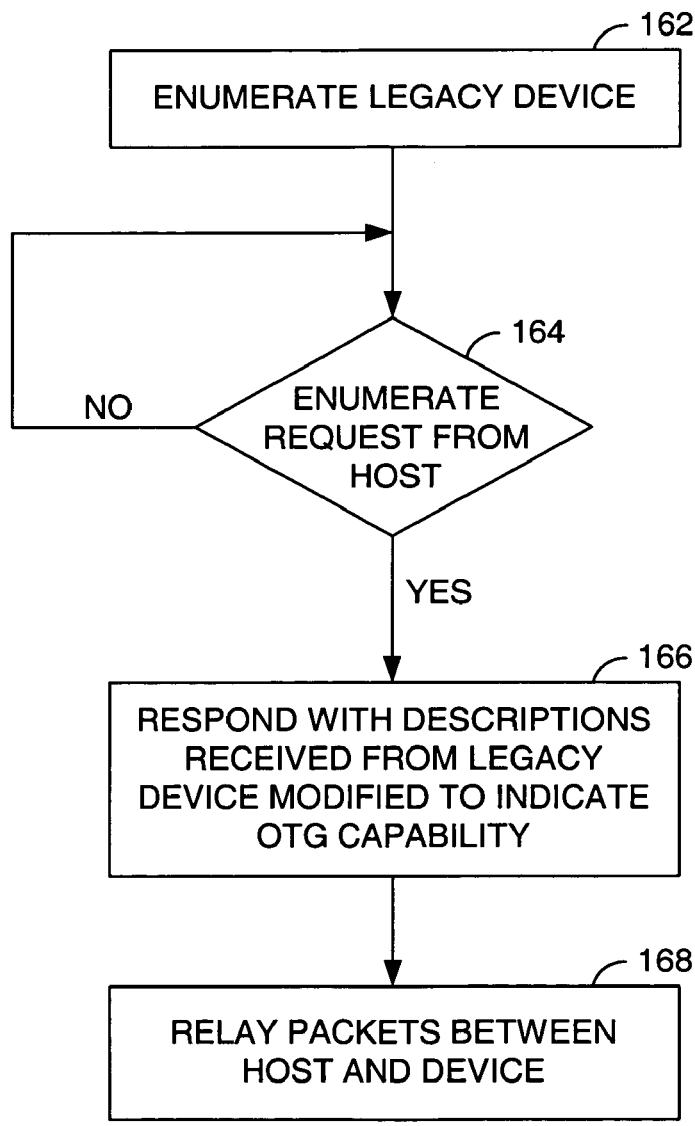
FIG. 8 is a flow diagram of another example operation in accordance with a preferred embodiment of the present invention.

Referring to FIG. 8, a flow diagram 160 illustrating another example operation of the present invention is shown. When the circuit 100 is configured as a peripheral device and the USB OTG device 104 is configured as the OTG (or PC) host, the circuit 100 may first enumerate the legacy USB device coupled to the port 102 (e.g., the block 162). When the USB OTG device coupled to the port 104 issues an enumeration request (e.g., the block 164), the circuit 100 may be configured to report the descriptors (modified to report OTG capability) received from the device coupled to the port 102 (e.g., the block 166). When the enumeration is complete, the circuit 100 may be configured to act as a relay station (e.g., the block 168).

Figure 9:
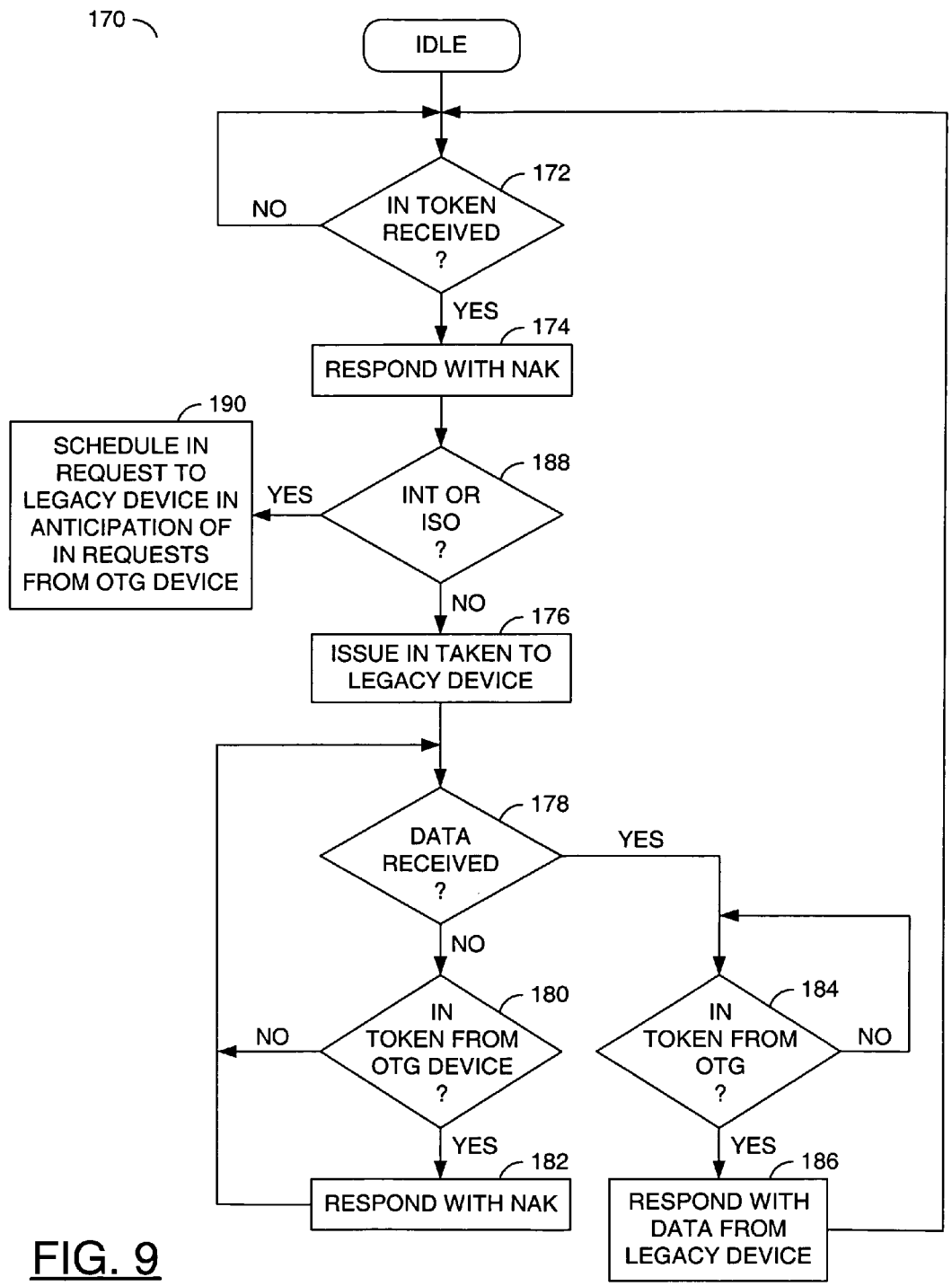
FIG. 9 is a flow diagram of yet another example operation in accordance with a preferred embodiment of the present invention.

Referring to FIG. 9, a flow diagram 170 illustrating yet another example operation of the present invention is shown. In the case of bulk endpoints, when the USB OTG device coupled to the port 104 issues an IN token (e.g., the block 172), the circuit 100 may respond with a "not acknowledge" (NAK) to the IN token (e.g., the block 174). The circuit 100 may be configured to immediately issue an IN token on the port 102 (or any other port to which the existing (legacy) USB device is connected (e.g., the block 176). Until the legacy USB device responds with data, the circuit 100 may continue to NAK further IN tokens (on the same endpoint) from the USB OTG device coupled to the port 104 (e.g., the blocks 178–182). When the circuit 100 receives a response from the legacy device coupled to the port 102, the circuit 100 may respond to the next IN token from the USB OTG device coupled to the port 104 with the data received from the device on the port 102 (e.g., the blocks 184 and 186).

In the case of interrupt and ISO endpoints, due to the predictable timing of IN requests from the USB OTG device coupled to the port 104, the circuit 100 may be configured to schedule IN requests to the legacy device coupled to the port 102 in anticipation of the IN request from the USB OTG device on the port 104 (e.g., the blocks 188 and 190). By scheduling IN requests to the legacy device, the data may be ready and waiting for the IN request from the USB OTG device on the port 104. For OUT endpoints, the operation may be similar, except that the "not acknowledge" stage and associated delay is generally unnecessary. The OUT transmission may be received and acknowledged, and then relayed to the device coupled to the port 102 by an OUT packet from the device coupled to the port 104.

The present invention may implement a microcontroller with two USB host/peripheral SIEs. An alternative implementation of the invention may implement one or both of the SIEs external to the controller 106. Furthermore, the functionality of the controller 106 and associated firmware may be implemented using a state machine or other appropriate logic.

Another alternative implementation of the present invention may allow a device to connect two legacy USB devices. For example, the system 100 may be configured to connect a legacy USB camera to a legacy USB printer, allowing the camera to print pictures without a PC being required. Such a configuration may be implemented either within a USB device such as a printer, or as an after-market accessory.

The system 100 may be configured to take into account the often substantial architectural differences between USB hosts and USB peripherals. The system 100 may provide an architecture for after-market accessories adding OTG functionality to the installed base of USB peripherals. The system 100 may provide a bridging function between legacy USB and OTG USB devices. The system 100 may also provide automatic retransmission by a device having two or more USB host or USB OTG dual role device ports (or a mix thereof) of data received from one port to device(s) connected to the other ports.

The system 100 may bring a fast and low-cost derivative of the USB OTG peripheral to the market. The system 100 may add OTG functionality to existing USB peripheral designs without the need to re-architect the existing design. The system 100 may be applicable to USB OTG implementations of future generations of cellular phone handsets.

The functions performed by the flow diagrams of FIGS. 7–9 may be implemented using a conventional general purpose digital computer programmed according to the teachings of the present specification, as will be apparent to those skilled in the relevant art (s). Appropriate software and/or firmware coding can readily be prepared by skilled programmers based on the teachings of the present disclosure, as will also be apparent to those skilled in the relevant art(s).

The present invention may also be implemented by the preparation of ASICs, FPGAs, PLDS, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMS, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a first circuit configured to (i) couple to a first legacy USB peripheral device and (ii) communicate to said first legacy USB peripheral device as a host interface;
   a second circuit coupled to said first circuit and configured to communicate as an OTG host/peripheral interface; and
   a third circuit configured to generate one or more control signals configured to (i) control operation of said first and said second circuits and (ii) transfer information between said first and said second circuits, wherein said first legacy USB peripheral device appears to be a USB on-the-go (OTG) dual role device (DRD).

2. The apparatus according to claim 1, further comprising a first device coupled to said first circuit.

3. The apparatus according to claim 2, wherein said first device comprises said first legacy USB peripheral device.

4. The apparatus according to claim 2, further comprising a second device coupled to said second circuit.

5. The apparatus according to claim 4, wherein said second device comprises a USB OTG dual role device (DRD).

6. The apparatus according to claim 4, wherein said second device comprises a second legacy USB device.

7. The apparatus according to claim 1, wherein said first circuit comprises a USB controller.

8. The apparatus according to claim 1, wherein said second circuit comprises a USB 2.0 on-the-go (OTG) dual role device (DRD) controller.

9. The apparatus according to claim 1, wherein said third circuit comprises a device selected from the group consisting of a microcontroller, a microprocessor, an ASIC, a DSP, and a PLD.

10. The apparatus according to claim 1, wherein said third circuit is configured in response to one or more computer executable instruction.

11. The apparatus according to claim 10, wherein said computer readable instructions comprise firmware.

12. The apparatus according to claim 10, wherein said computer readable instructions comprise software.

13. The apparatus according to claim 2, wherein said apparatus is integrated with said first device.

14. The apparatus according to claim 1, wherein said apparatus is configured as a stand alone accessory.

15. The apparatus according to claim 2, wherein said apparatus is configured to add USB OTG dual role device (DRD) capabilities to said first device with no modifications to said first device.

16. An apparatus comprising:
    means for communicating as a host interface with a legacy USB peripheral device; and
    means for communicating as a USB OTG dual role device (DRD) coupled to said means for communicating as a host interface; and
    means for generating one or more control signals configured (i) to control said means for communicating as a host interface and said means for communicating as a USB OTG dual role device and (ii) to communicate information between said means for communicating as a host interface with said legacy USB peripheral device and said means for communicating as a USB OTG dual role device (DRD), wherein said legacy USB peripheral device appears to be a USB on-the-go (OTG) dual role device (DRD).

17. A method for adding USB on-the-go (OTG) dual role device (DRD) capability to a legacy USB peripheral device comprising the steps of:
    configuring a host interface to couple to said legacy USB peripheral device;
    coupling an OTG host/peripheral interface to said host interface; and
    generating one or more control signals configured (i) to control operation of said host interface and said OTG host/peripheral interface and (ii) to communicate information between said host and said OTG host/peripheral interfaces, wherein said legacy USB peripheral device appears to be a USB on-the-go (OTG) dual role device (DRD).

18. The method according to claim 17, further comprising the steps of:
    enumerating a first device; and
    responding to an enumeration request from a second device with descriptors received from said first device modified to indicate OTG DRD capability.

19. The method according to claim 17, further comprising the steps of:
    responding to an IN token received through said OTG host/peripheral interface with a NAK;
    sending an IN token via said host interface;
    repeatedly responding with NAKs to IN tokens from said OTG host/peripheral interface until data is received via said host interface; and
    sending said data received from said host interface via said OTG host/peripheral interface in response to an IN token.

20. The method according to claim 17, further comprising the steps of:
    polling said host interface for an OUT token;
    polling said OTG host/peripheral interface for an OUT token;
    sending data received from either interface to the other interface.

21. A computer readable media comprising computer executable instructions for performing the steps according to claim 17.

22. The apparatus according to claim 1, wherein said first circuit, said second circuit and said third circuit are implemented in a single integrated circuit (IC).

23. The apparatus according to claim 1, wherein:

said first circuit comprises (i) a host controller configured to operate in response to one or more first control signals and (ii) a first analog block configured to detect or control one or more operations selected from the group consisting of VBUS pulsing, ID pin sensing, overcurrent control and detection, host/slave LED indication, and VBUS On/Off control;

said second circuit comprises (i) a host/peripheral controller configured to operate in response to one or more second control signals and (ii) a second analog block configured to detect or control one or more operations selected from the group consisting of VBUS pulsing, ID pin sensing, overcurrent control and detection, host/slave LED indication, and VBUS On/Off control; and said third circuit is further configured to generate said one or more first control signals and said one or more second control signals.

* * * * *